United States Patent
Bornhorst et al.

(10) Patent No.: US 9,961,743 B2
(45) Date of Patent: May 1, 2018

(54) PORTABLE POWER AND SIGNAL DISTRIBUTION SYSTEM FOR A CONTROLLABLE SYSTEM INCLUDING MULTIPLE DEVICES

(71) Applicant: Production Resource Group LLC, New Windsor, NY (US)

(72) Inventors: James Bornhorst, DeSoto, TX (US); John Covington, Carrollton, TX (US)

(73) Assignee: Production Resource Group LLC, New Windsor, NY (US)

( * ) Notice: Subject to any disclaimer, the term of this patent is extended or adjusted under 35 U.S.C. 154(b) by 611 days.

(21) Appl. No.: 14/557,738

(22) Filed: Dec. 2, 2014

(65) Prior Publication Data

US 2015/0084437 A1 Mar. 26, 2015

Related U.S. Application Data

(60) Division of application No. 13/526,744, filed on Jun. 19, 2012, now Pat. No. 8,901,416, which is a
(Continued)

(51) Int. Cl.
| | |
|---|---|
| *H01H 35/00* | (2006.01) |
| *H05B 37/02* | (2006.01) |
| *H04B 3/54* | (2006.01) |
| *G05B 13/02* | (2006.01) |
| *H05B 37/03* | (2006.01) |

(52) U.S. Cl.
CPC ..... *H05B 37/0209* (2013.01); *G05B 13/0205* (2013.01); *H04B 3/54* (2013.01); *H05B 37/03* (2013.01); *H04B 2203/547* (2013.01); *H04B 2203/5445* (2013.01);
(Continued)

(58) Field of Classification Search
CPC .... B29B 7/7678; B29B 7/7663; H02H 3/006; H02J 3/005; H02J 13/0079
See application file for complete search history.

(56) References Cited

U.S. PATENT DOCUMENTS 3,943,397 A 3/1976 Yancy
4,626,211 A 12/1986 Coston
(Continued)

FOREIGN PATENT DOCUMENTS

EP 0444636 9/1991
GB 2219448 12/1989

*Primary Examiner* — Sibin Chen
(74) *Attorney, Agent, or Firm* — Law Office of Scott C Harris, Inc

(57) ABSTRACT

A power supply assembly which can drive a number of different devices at different voltages. A rack holds a number of breaker modules, and each breaker module can connect to one or many breakout boxes. The breakout boxes are keyed to the breaker modules, so that the breaker boxes will not be energized with power unless they are the proper voltage and/or configuration to receive that power. The coil of a contactor in the breaker module is powered by a key wire that is connected through specified pins in the breakout box. Therefore, no power is ever provided to the breakout box unless it is of the proper voltage configuration. In addition, feeder power to the power supply assembly is provided over bolted connections, without any wire connections between the power feed and the circuit breaker.

14 Claims, 13 Drawing Sheets

Related U.S. Application Data continuation of application No. 11/190,494, filed on Jul. 26, 2005, now Pat. No. 8,203,828.

(60) Provisional application No. 60/647,922, filed on Jan. 27, 2005.

(52) U.S. Cl.
CPC ... *H04B 2203/5466* (2013.01); *Y10T 307/766* (2015.04); *Y10T 307/858* (2015.04)

(56) References Cited

U.S. PATENT DOCUMENTS

| | | | |
|---|---|---|---|
| 4,668,035 A | | 5/1987 | Jego et al. |
| 5,203,713 A | | 4/1993 | French et al. |
| 5,252,086 A | | 10/1993 | Russell et al. |
| 5,340,326 A | * | 8/1994 | LeMaster ............... H01R 25/00 439/207 |
| 5,384,490 A | | 1/1995 | Swartz, Jr. |
| 5,570,002 A | | 10/1996 | Castleman |
| 5,675,194 A | | 10/1997 | Domigan |
| 5,818,201 A | * | 10/1998 | Stockstad ............. H02J 7/0016 320/116 |
| 6,507,506 B1 | | 1/2003 | Pinas et al. |
| 7,002,265 B2 | | 2/2006 | Potega |
| 2002/0047552 A1 | | 4/2002 | Sano et al. |
| 2002/0117899 A1 | | 8/2002 | Seefried et al. |
| 2002/0135232 A1 | | 9/2002 | McMillan |
| 2004/0113804 A1 | | 6/2004 | Cabrera |

\* cited by examiner

PORTABLE POWER AND SIGNAL DISTRIBUTION SYSTEM FOR A CONTROLLABLE SYSTEM INCLUDING MULTIPLE DEVICES

This application is a continuation application of U.S. Ser. No. 11/190,494 filed Jul. 26, 2005, which claims priority from provisional application Ser. No. 60/647,922, filed Jan. 27, 2005, the contents of which are herein incorporated by reference.

BACKGROUND

A lighting effect is often created using many different devices. Each of the lights may use relatively high power lamps in order to produce the desired brightness. The high power lights correspondingly require large amounts of supply current. The current may be delivered from an electrical service to a distribution device, from which it is sent to the various lights. Exemplary lighting effects may include lighting a show on a stage or in concert, for example, in an exhibition, or to light an area that is too large to be lit by a single light. Moreover, a system of this type may include devices such as sound equipment, smoke machines, rigging motors, video projectors and video systems, all of which are driven from AC current.

Both power and controlling signals need to be sent to each of the multiple devices. It is desirable that the distribution of the power from a high current source to the lights be relatively convenient, and very safe. Moreover, the lights may be powered from different kinds of power, e.g., different voltages, e.g., 120 and 208 volts. It may be dangerous to power a lower voltage light from a higher voltage supply. For example, plugging a light intended for 120 volts into a 208 volt supply may cause dangerous arcing or other hazards.

Previous systems have used separate cabling for control, and separate cabling for power distribution. Each of these different cable systems requires time and labor to assemble, and each requires separate cables and connectors, each of which add cost to the system.

The controlling signals are used to control the individual lights. The lights may be controlled via a control network, such as Ethernet or DMX control or DMX over Ethernet, or any other controlling format. This has typically been done by distributing control lines to each of the lights. It is also important that the signals distributed to the lights be relatively free of electrical noise.

SUMMARY

Techniques are disclosed which enable distributing both power and signals to a plurality of controlled devices. A number of different embodiments enhance the safety and convenience of the system.

DETAILED DESCRIPTION

The general structure and techniques, and more specific embodiments which can be used to effect different ways of carrying out the more general goals are described herein.

Figure 1:
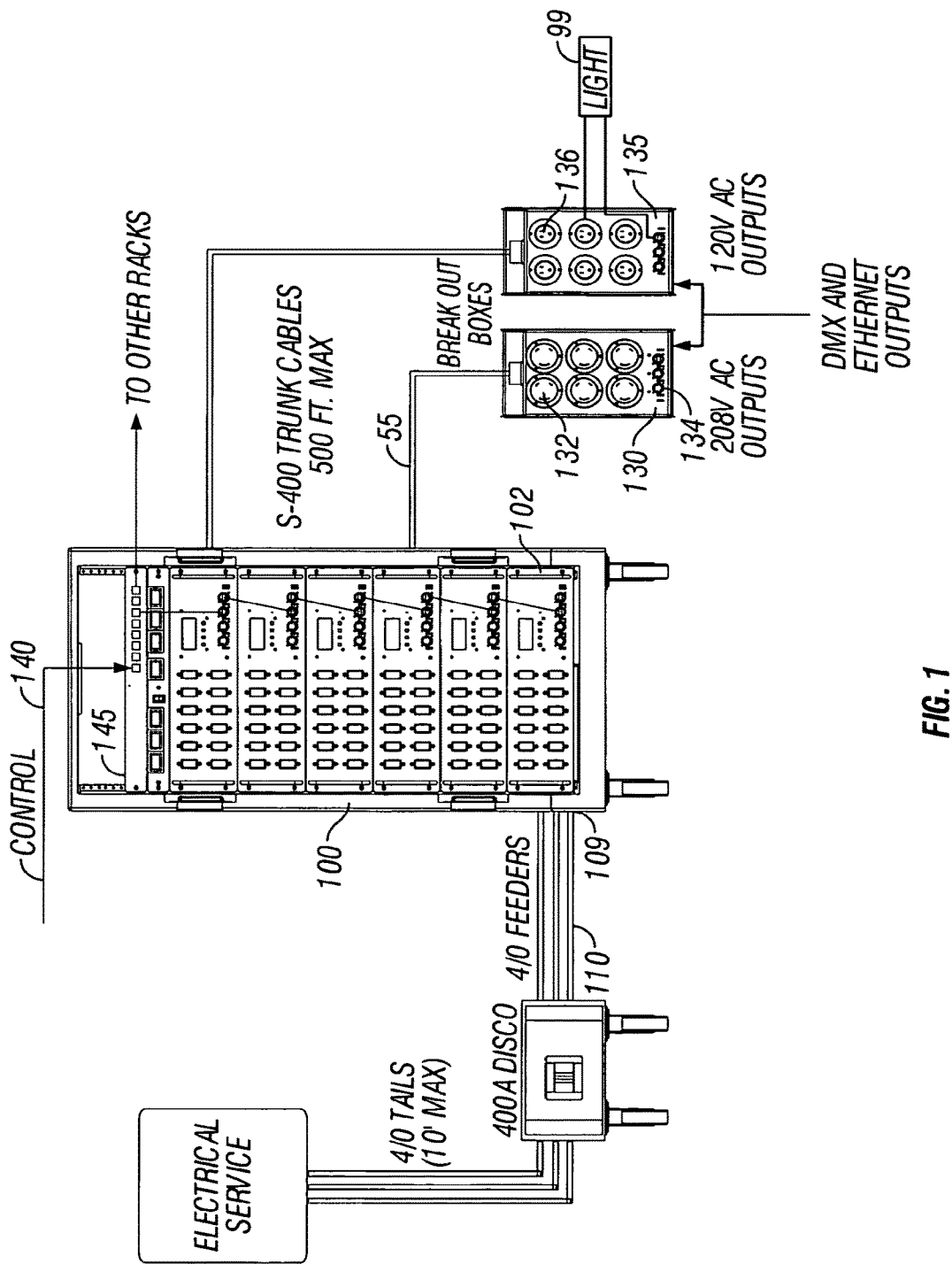
FIG. 1 shows a block diagram of the basic system and its basic parts.

FIG. 1 shows an overall block diagram of an embodiment which distributes both power and control signals to remotely-located lamps such as 99. Each of the lamps 99 are connected to receive both power and controlling signals from a breakout box. The distribution rack 100 is a rack formed with a number of breaker modules such as 102, each of which controls a specified output. The distribution rack 100 receives electrical power 55, for example from 4/0 feeder cables providing 400 amp, 3 phase power for distribution. The distribution rack 100 also receives a control signal shown as 140, which in this case is an Ethernet signal sent to an Ethernet switch 145. Both three phase power and control signals are distributed to each of the breaker modules 102. Each of the breaker modules 102 produces a combined power and signal output 120 over a specially-configured cable which includes both power and control conductors.

The output 120 is connected to a breakout box 130. There are multiple different configurations of breakout boxes. A different output from a different breaker module is connected to breakout box 135, of a different configuration than breakout box 130. For example, breakout box 130 is configured for 208 volts AC, and has 208 volt outlets 132, as well as control connections 134.

The control can be in any form that controls one or many lights, for example Ethernet, the industry standard DMX, or any other addressable, timeslot controlled, or other type control line. Analogously, the breakout box 135 includes 120 volt AC outlets 136.

The distribution rack 100 divides the high current feed 120 into a number of separately breakered power feeds. These feeds are distributed over the same cable that also carries the control therein. Note however, that multiple voltages may be simultaneously present in the distribution rack 100. An embodiment may apply different voltages to different breakout boxes. An alternative embodiment can allow different voltages to be output to different outlets on the same breakout box.

If a 120 volt outlet were connected to receive 208 volt power, however, damage to the lights and safety issues could occur. Each breakout box is wire coded according to its configuration. A wire loopback technique using "key wires" ensures that the proper voltage(s) are provided to the specific breakout box. No voltage at all will be provided unless and until a properly-configured breakout box is connected to the breaker module.

In the embodiment, the breakout box has a loopback connection over key wires that is coded according to its intended voltage. The embodiment may have individual wires that are used as hardwired key wires. The breakout box includes a loopback that requires compatibility before energizing the breakout box properly. For example, the individual key wires may include 5 different possible wire connections, with two of those five wires being connected for any individual connection. For example, a 120 volt breakout box may have wire 2 connected to wire 5. A 120 volt breaker module will not output any output voltage to the breakout box outlets until and unless wire 2 is connected to wire 5. Therefore, no output power will be supplied until a properly configured breakout box is connected to the breaker module.

This protects against application of the wrong voltage to the breakout box.

As an additional safety mechanism, power is not connected to the breakout box until the breakout box and all intermediate connections have been completely connected. Therefore, power is not applied to the cable 120 until a compatible breakout box has been connected. Therefore, any unterminated trunk connector is never powered live. People handling the connector are not in danger, even if they are in dangerous surroundings, such as standing in water.

Figure 2:
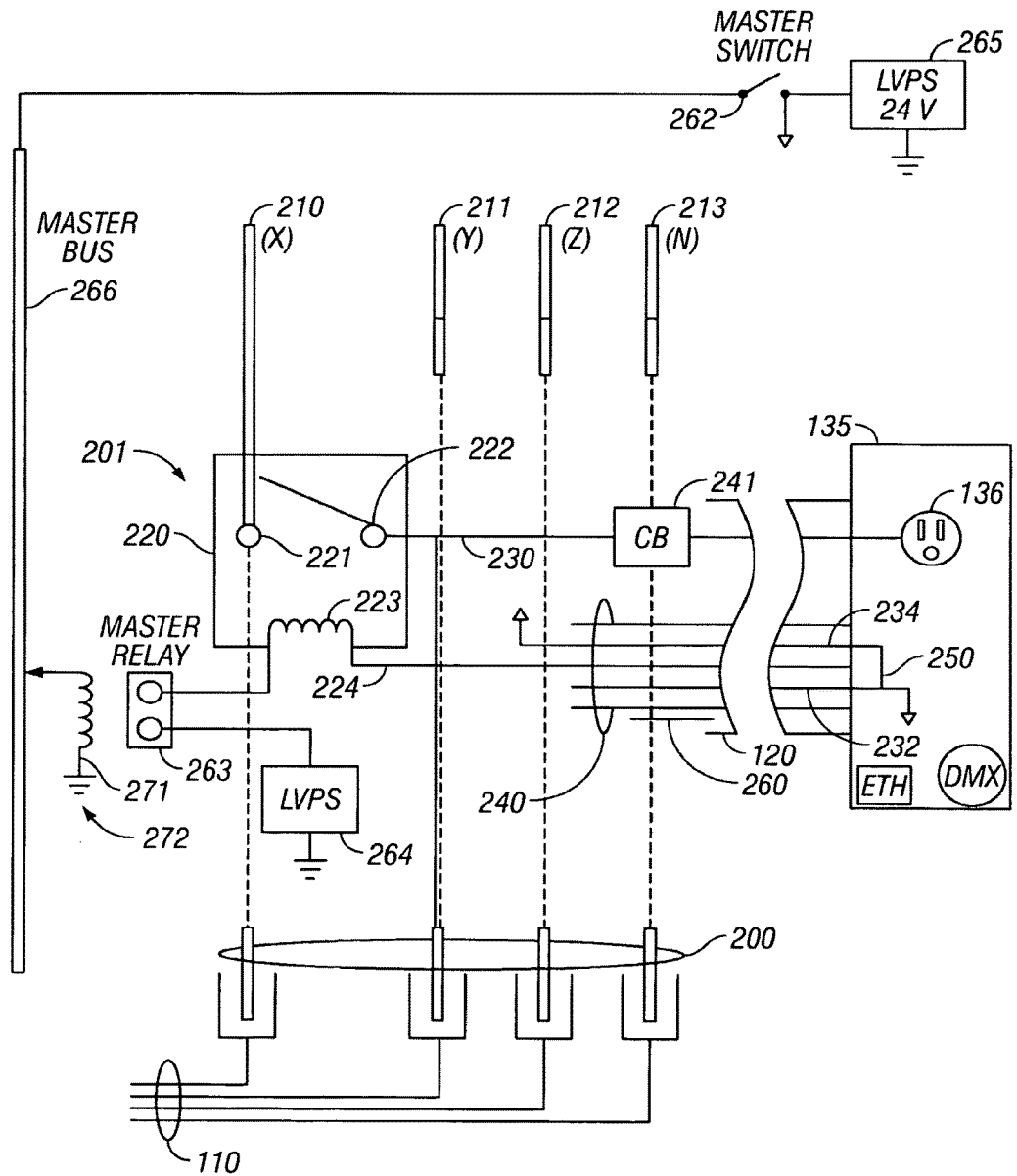
FIG. 2 shows a wiring diagram of the power supply.

FIG. 2 shows the electrical connection between the distribution rack 100 and the breakout box 135. The main power trunk 110 is input to a 3 phase bus bar system 200, formed of busbars 210, 211, 212, 213 within the distribution rack, as described in further detail herein. It should also be understood that each of the relays shown in FIG. 2 may use pilot relays—where two relays in series are used in place of one single relay. The use of two series connected pilot relays avoids the need to source or sink large amounts of power through the relay coil.

The bus bar system 200 provides power in parallel to each of the breaker modules, including the breaker module 201 as shown. The power from the bus bar is applied via a high current contactor 220. In the embodiment, a 75 amp contactor may be used. The contacts 221, 222 are in series between the busbars 200, the power line 230 and the trunk cable 120. The open or closed position of the contactor is controlled by a contactor coil 223. When the contactor coil 223 is energized, the contacts 221 and 222 are connected. The power line 230 provides power to the outlet 136 within the breakout box. The contactor switches all phases of the power.

The contactor feeds a set of circuit breakers 241 as described herein. The output of each of the breakers is sent down the trunk cable to outlets 136. The individual breakers each control power to an individual set of outlets.

A five wire bundle shown generally as 240 is used to provide 10 different combinations, allowing 10 different unique breakout box/breaker module combinations. Of course, any number of wires can be used for this purpose, allowing any number of unique configurations.

The energization 224 for the contactor control coil 223 may be connected in series via the proper key wires. Therefore, the contactor can only be energized when the proper key wires are connected to one another, so that the contactor coil receives power across a complete path. The connection between the key wires is provided by an internal connection within the breakout box. If the coding of the breaker module does not match the coding of the breakout box, then the relay coil circuit is not completed, and no power is supplied.

In operation, the control for the contactors are energized via power over the key wires. A contactor can only be energized when the two key wires 232, 234 are connected within the breakout box. The breakout box 135 includes the provision to accept all five of the wires, but only a specified pair of the wires is connected at 250. In FIG. 2, the wire 232 is connected to the wire 234. This ensures that the voltage and/or other characteristics of the breakout box 135 is matched to the specific breaker modules 201, before applying power.

A master bus 266 is also used for an additional degree of safety. A master relay 271 has contacts 263 which are in series between the power supply 264 and the coil 223 of the master contactor 220. The contacts 263 of the master relay 271 must be closed in order for any power to be supplied.

A master bus power supply 265 provides power for many devices in the rack. A master switch 262 is in series between the power supply 265 and the master bus 266. In the embodiment, the master bus 266 is formed by a fifth busbar within the system. The coil 264 for the master relay 271 is energized from the master bus. When power is present on the master bus, the contacts 263 are closed, thereby enabling the contactor 220 to supply power when those conditions are met. However, should the master switch 262 be opened, it automatically turns off all power to all breakout boxes, thereby opening all of the relays is also provided. The power for the contactor coil 223, and for the loopback/key lines, comes from a low-voltage power supply 264. Switch 262 is placed in series between the low-voltage power supply 264 and the contactor coil 223. When the switch is open, the current through the contactor coils is interrupted. Each of the contactors open, thus shutting down current to all the loads connected to the breakout boxes. Thus, the master switch 262 is an emergency switch that shuts down all power out of the rack, e.g., can be used for emergency or for convenience. This may eliminate the need for an operator to switch off all 72 circuit breakers on the breakout modules configured in a rack.

The above describes the low-voltage power supply providing power to the relay coils such as 272 and 223. Many high power relays, however, require 120 V power to the relays. The use of a pilot relay may allow a low-voltage power such as 264 to be connected to the coil of the pilot relay, with the switchable contacts of the pilot relay then providing 120 V power to the main coil.

For example, if the breaker module 201 is configured to provide 120 volt power, then a specified pair of wires, here 232 and 234, are required for loopback. This ensures that the 120 volt power will only be provided over a breakout box that is configured with 120 volt outlets.

An internal loopback connection 250 is maintained within the breakout box. This internal loopback connection in this embodiment loops back between wires 232 and 234 to indicate that the breakout box 135 is a 120 volt breakout box. For example, a different connection between wires may be used for a different loopback connection. The five different wires provide the capability to provide 10 different combinations of loopback, and hence 10 different possible configurations of breakout boxes.

The cable 120 carries power, ground and signal, however, has no power connected to the power-containing hot lines until the loopback is established to energize the contactor. Once the loopback is established, the contactor 220 is energized, and power is applied to line 230 to provide power to the outlets 136. Until then, however, the cable remains unpowered; other than the controlling power on the key lines.

Alternatively, while the above has described 120 volt connections, it should be understood that this system can also be used with 208 volt connections and with any other voltages. For a 208 volt signal, the operation may be adapted to provide six 15 amp outlets, or three 30 amp outlets, or any combination thereof. The system may also use multiple phase controls and connections. For example, a breakout box may be configured to supply 3 phase power to outlets on the box. Each unique breakout box power configuration can use a different loopback connection. The system therefore prevents the wrong breakout box from being used relative to the voltage output which is provided.

For further safety, the loopback voltages may be current controlled and/or ground fault interrupt protected.

In addition to the key wires, there is also a control cable 260 in 120 which is distributed from the distribution rack 100 to the breakout boxes 135. This control cable may provide controlling signals for the lights that are powered by the outlets. For example, this control may be one or many universes of DMX control, Ethernet control, or any other control protocol for devices or combinations thereof. Naturally, the protocol can only be those which are compatible with the wire or signal carrier within the cable. For example, any protocol that can travel over twisted pair can be used.

Figure 3:
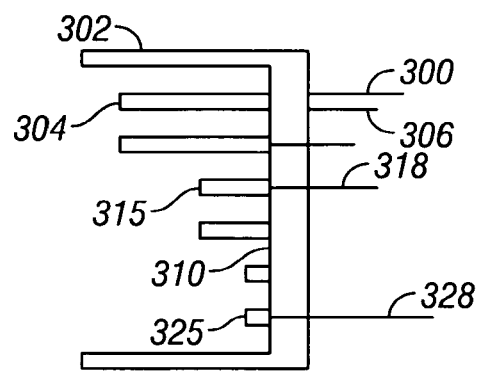
FIG. 3 shows a cross-section across a connector.
Figure 4:
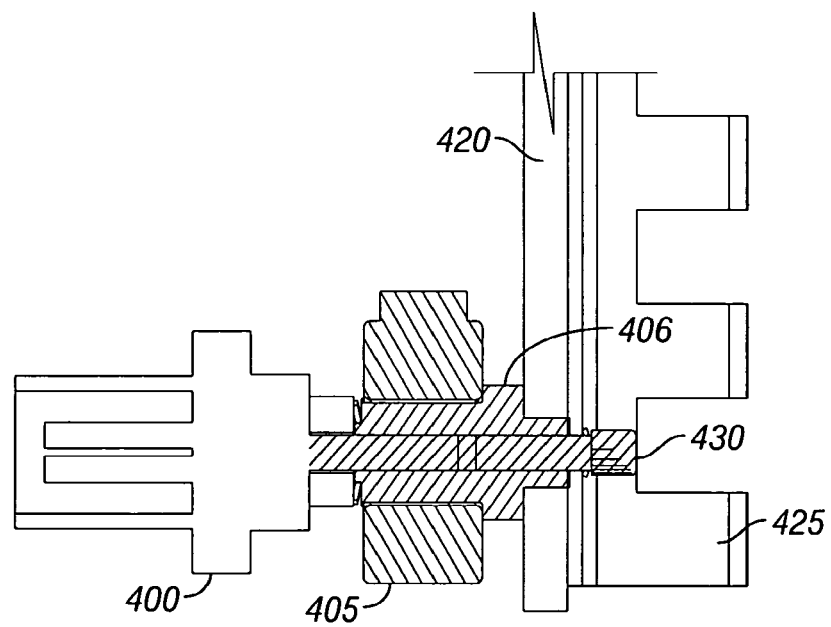
FIG. 4 shows a screw connection between power feed and busbars.

Another aspect is enabled by the pin configuration of the connector pins. FIG. 3 shows a detailed diagram of the end of cable 300 and an exemplary cross section showing the connector pins 302. The connector 302 includes a plurality of pins at different heights relative to the bottom surface 310 of the connector. Each of the pins are connected to corresponding wires within the cable 300. There may be multiples of each kind of pin. FIG. 3 shows 2 of each kind of pin, but it should be understood that there may be many, e.g., between 1 and 15 of each kind of pin, for example.

Pin 304 is connected to wire 306 within the cable. Pin 304 represents the safety ground, and the wire 306 is hence connected to the safety ground. Pins 304 extend out the furthest relative to the bottom surface 310 of the connector. Therefore, when the connector is mated, the pins 304 make contact first, thereby insuring that the safety ground contact is established first. This makes sure, for example, that the breakout boxes are grounded first during connection.

Pins 315 make contact second, and are connected to wires 318 which represent the power connection, e.g., AC power such as 120 volts and/or 208 and/or 220 volts. Note, as above, that these wires are not energized until the contactors are energized via the key lines.

Pins 325 extend the shortest distance up, and are connected to the wires such as 328 which represent the signal lines. The signal lines include the key lines discussed above, as well as other signals such as Ethernet and DMX.

Each of the sets of pins are recessed relative to the other, sufficiently to ensure a full connection of one set of pins, before the next set of pins is able to obtain a connection. For example, the recess amount may be by about 1 mm, but more generally any recess amount between 0.3 mm and 5 mm may be appropriate, depending on the size of the connector and other parameters.

In this way, and in operation, the safety ground is established first, based on the furthest out pins 304 making the first connection. After the safety ground is established, power wires are connected over pins 315, but the breakout box will not actually be powered until the contactor is energized based on the key lines. Finally, the key lines and the Ethernet and other control lines are connected, which powers up the contactor, providing power to the system.

Another problem with systems of this type is that connections can come loose. This becomes especially problematic for high current connections that are established from within the rack. An aspect of this system, therefore, maintains all connections via solid metal to metal bolting; from the beginning entry portion 109, all the way to the connections out of the contactors. This metal to metal bolting can minimize the voltage drop and can prevent wires from being pulled loose. The bolting of solid metal connectors eliminates crimped connections of standard wires. The crimped connections to high current conductors are often difficult to properly apply, and can come loose over time. This itself causes a safety hazard. A loose crimp heats under a high current load, and will also oxidize over time, and become an even poorer connection.

The crimp is also an added connection between the conductor and the intended termination. Each connection may cause a voltage drop. This system may eliminate the need for stranded wire and crimp connections in any of the high current conductor portions, since the entire portion is formed by metal to metal bolting.

The power connection is illustrated in FIGS. 4-9. The input power line 109 is attached to a standard type of cam lock connector 400 which has a threaded output 402. The threaded output 402 of the cam lock connector is screwed into a solid standoff 410. A current transformer 405 surrounds the solid metal threaded standoff 410. The cam lock connector screws into one side. A bolt 430 secures the busbar to the insulator 420 and screws into the other side. The current transformer provides output signals which can be used for control and/or meters that determine and/or display total consumed current.

The second bolt is screwed directly to bus bars 425. A separate bus bar is provided for each of the phases and for neutral.

Figure 5:
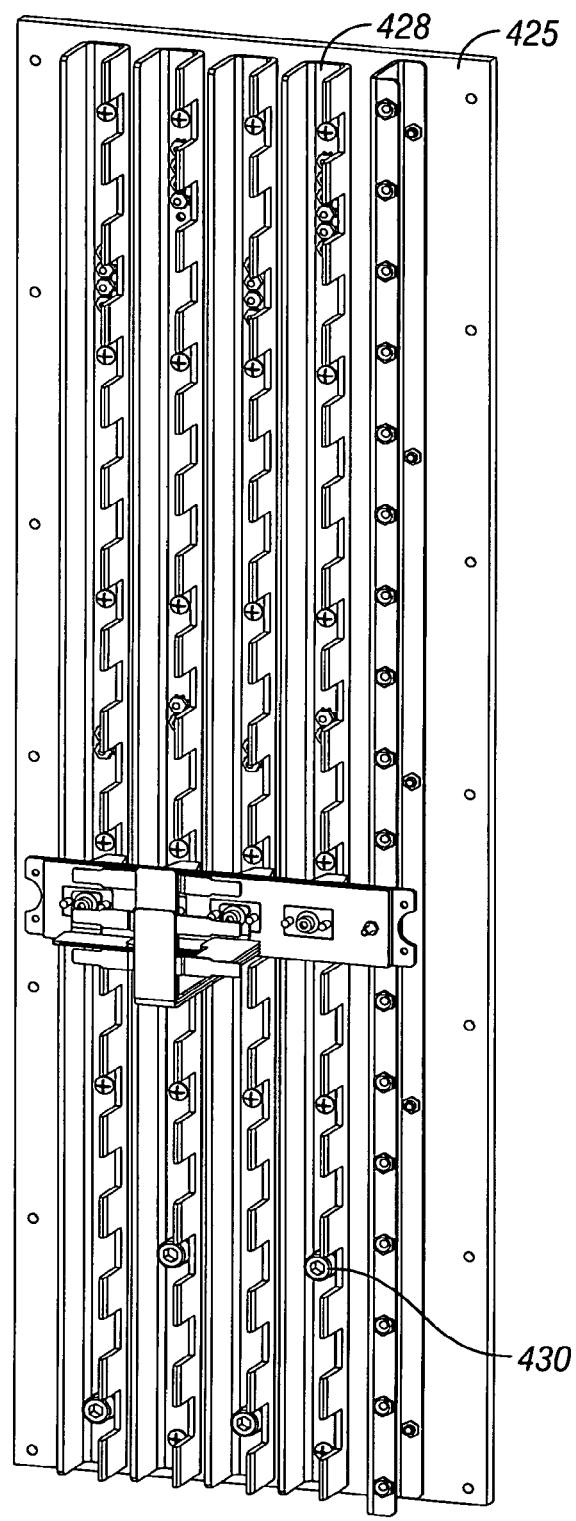
FIGS. 5 and 6 illustrate the busbars and their connections.

FIG. 5 shows a front on view of the insulator sheet, 420, along with the bus bar 428 and its connection bolt 430. The insulator sheets may be fiberglass, for example.

Each of the bus bars are formed of ⅛ inch thick copper, nickel plated, arranged with indented portions 600, and extending portions 605. The extending portions 605 on the bus bars form connecting tangs for connection to appropriately configured connectors on breaker modules. Each leading edge 603 of the extending portion 605 has a slight bevel, making it thinner at the front edge to facilitate connection. The bus bar tangs are formed in 1 "U" increments, where each U or unit is 1¾ inches vertically.

Figure 6:
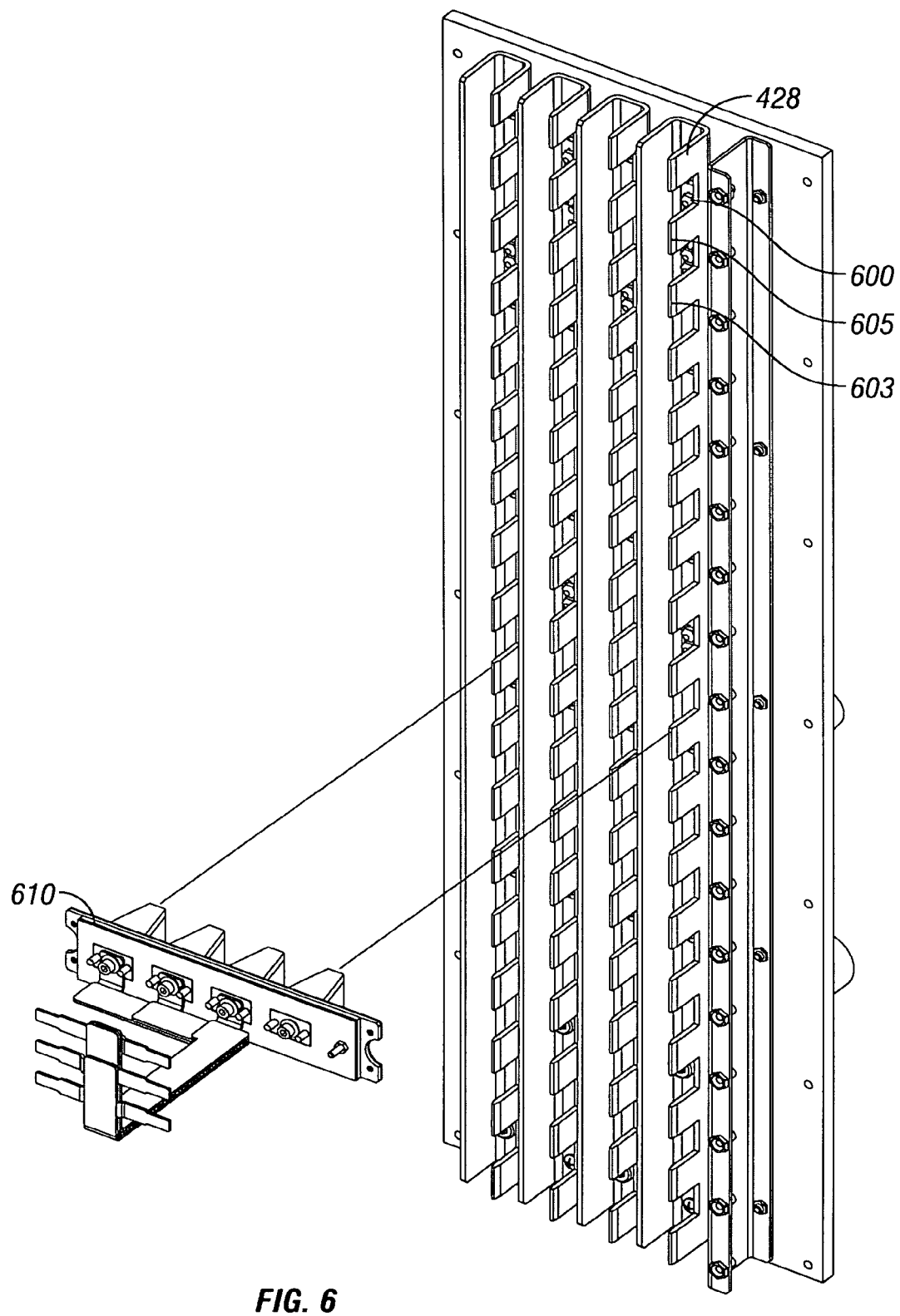

FIG. 6 shows a side view of the bus bars such as 428, showing the indented portion 600 and the extending portions 605 forming the tangs.

"Crown" connectors 610 fit on the tangs to make contact therewith, again without wire connections.

Each of the four bus bars, for example, can carry a different part of the electrical supply. For example, the four bus bars shown in FIG. 5 may carry electrical neutral, electrical phase A, electrical phase B and electrical phase C. Each of the extending portions, or "tangs" on the bus bar, are sized to connect to a corresponding crown connector as shown above.

Figure 7:
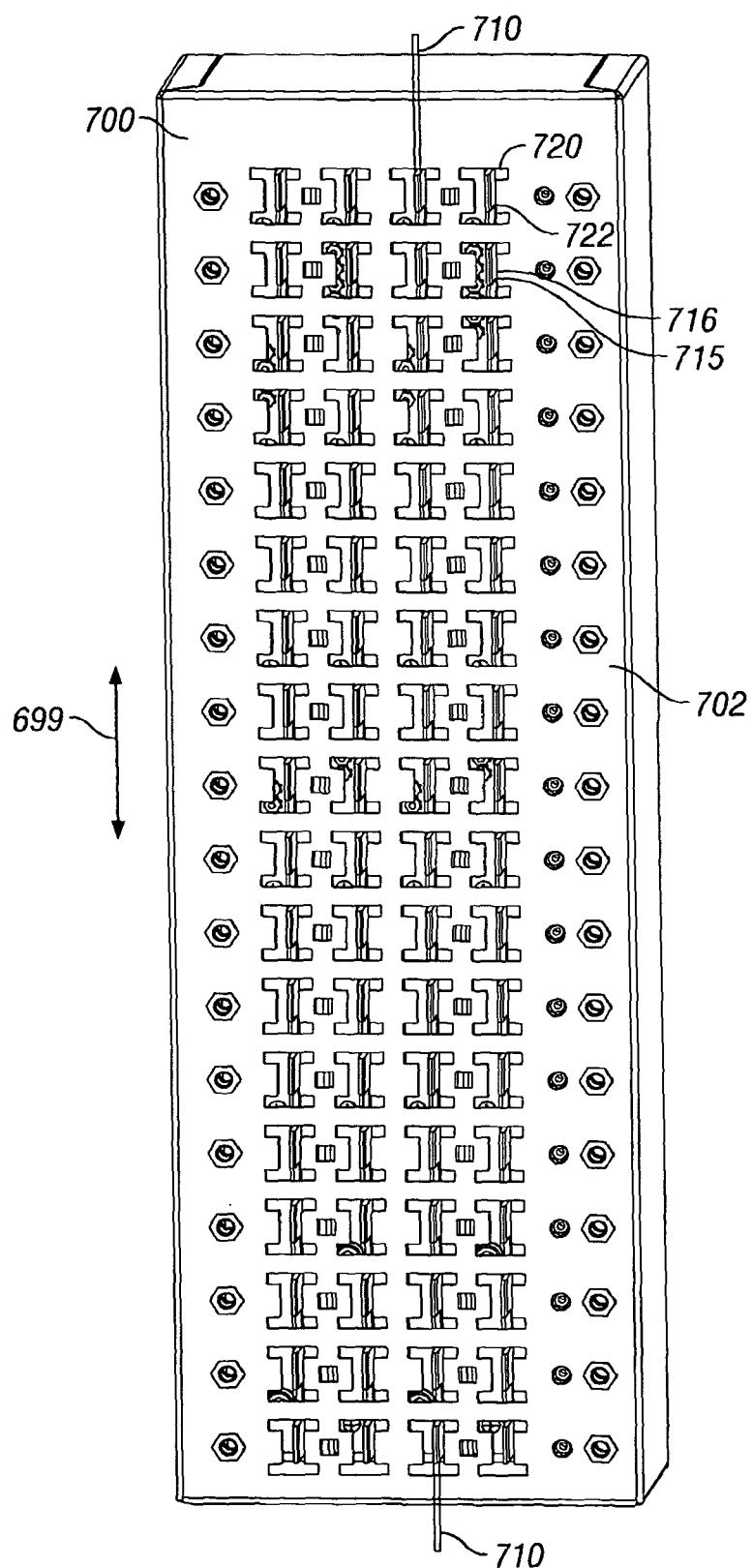
FIG. 7 illustrates a safety cage for the busbars.

A safety cage 700 is shown in FIG. 7. The safety cage includes a front surface 702 which faces towards the modules in the unit. The safety cage also includes a plurality of openings such as 705. The central portion of each of these openings is spaced at the same pitch as the pitch between tangs of the bus bar. Each of the bus bars extend longitudinally along the axis 699 in FIG. 7. A bus bar is shown as 710 in FIG. 7. A plurality of openings 705 are provided in registration with each of the tangs of the bus bar. For example, bus bar 710 extends past openings 715, 720, and other openings in that series. Each tang of the bus bar 710 is aligned with one of the openings in the safety cage, for example, tang 716 is aligned with opening 715; tang 722 is aligned with opening 720. However, at all times, the bus bar 710 is behind the front surface 702, thereby protecting the user against the high voltage on the bus bars.

Of course, any number of bus bars, e.g., 2 or 3, or 4 or 5, or more, can be used. The safety cage is shown with substantially I shaped openings through which the connectors extend; however the openings can be other shapes, such as rectangular or circular in shape.

Figure 8:
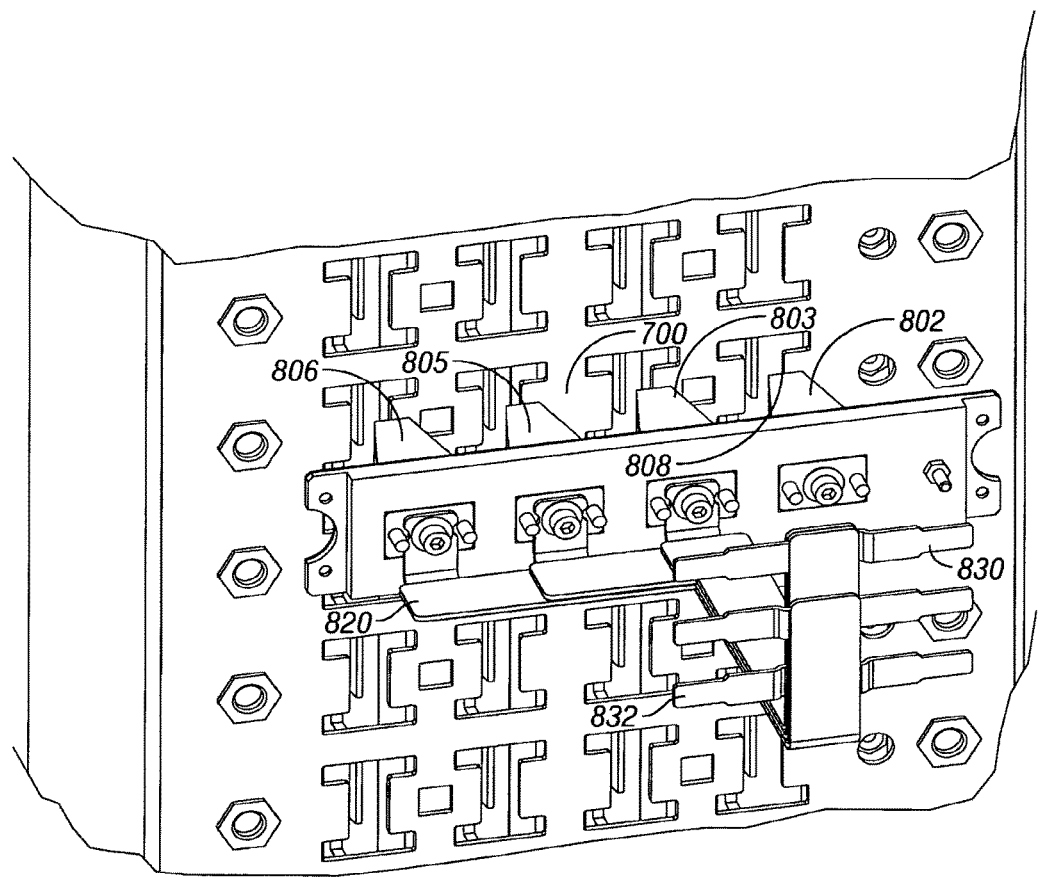
FIG. 8 illustrates a connector assembly for the busbars.

FIG. 8 shows a connector assembly 800 used in the breaker modules that connect to the bus bars. The connectors 800 include crown connectors 802 which plug into correspondingly located tangs 804 on the bus bars. There may be four crown connectors on each connector depending on the phases: 802, 803, 805 and 806. Each crown connector is sized and spaced to connect into a respective one of the bus bars. The openings 715, 720 in the safety cage 700 are also spaced to allow the crown connectors to extend therethrough and to contact the bus bars. Therefore, the leading surface 808 of the crown connector 802 extends through a hole in the safety cage and connects to tang 804. The crown connectors have a substantially beveled outer shape. These may use Elcon Blind Mate connectors.

In operation, each of a plurality of breaker modules is connected into corresponding slots within the rack. Each of the breaker modules may have wheels that allow them to roll along tracks 1010 in the housing; see FIG. 10.

Figure 9:
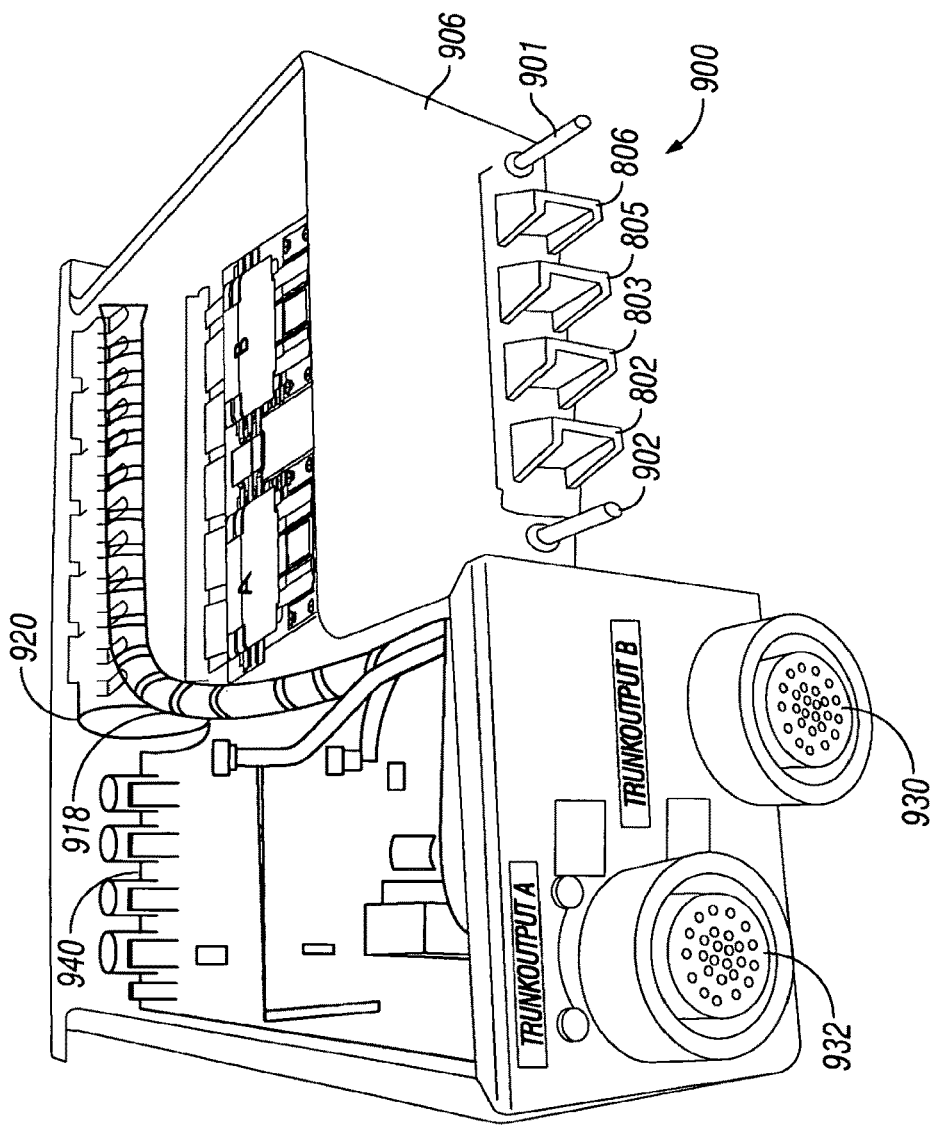
FIG. 9 illustrates the breaker module and its connection.

FIG. 9 shows a rear view of a breaker module. The breaker module includes a connector area 900 which includes the crown connectors 802, 803, 805 and 806. Each of these connectors is intended to receive a different phase of the electric supply from a corresponding bus bar to which it connects. For example, in FIG. 9, the connector 802 receives neutral, and the connector 803 receives the x phase. In the case of single phase electricity, some of the connectors may not be present, or may simply be connected at the bus bar and unconnected at the other end.

In addition, the connector area includes ground pins 902, 904. These ground pins extend out further from the rear surface 906 of the breaker module than the furthest extending ends of the crown connectors. Accordingly, when the breaker modules roll into place in the housing, the ground lugs 902, 904 make contact prior to the crown connectors and hence prior to power being applied, hence providing a level of safety.

Figure 10:
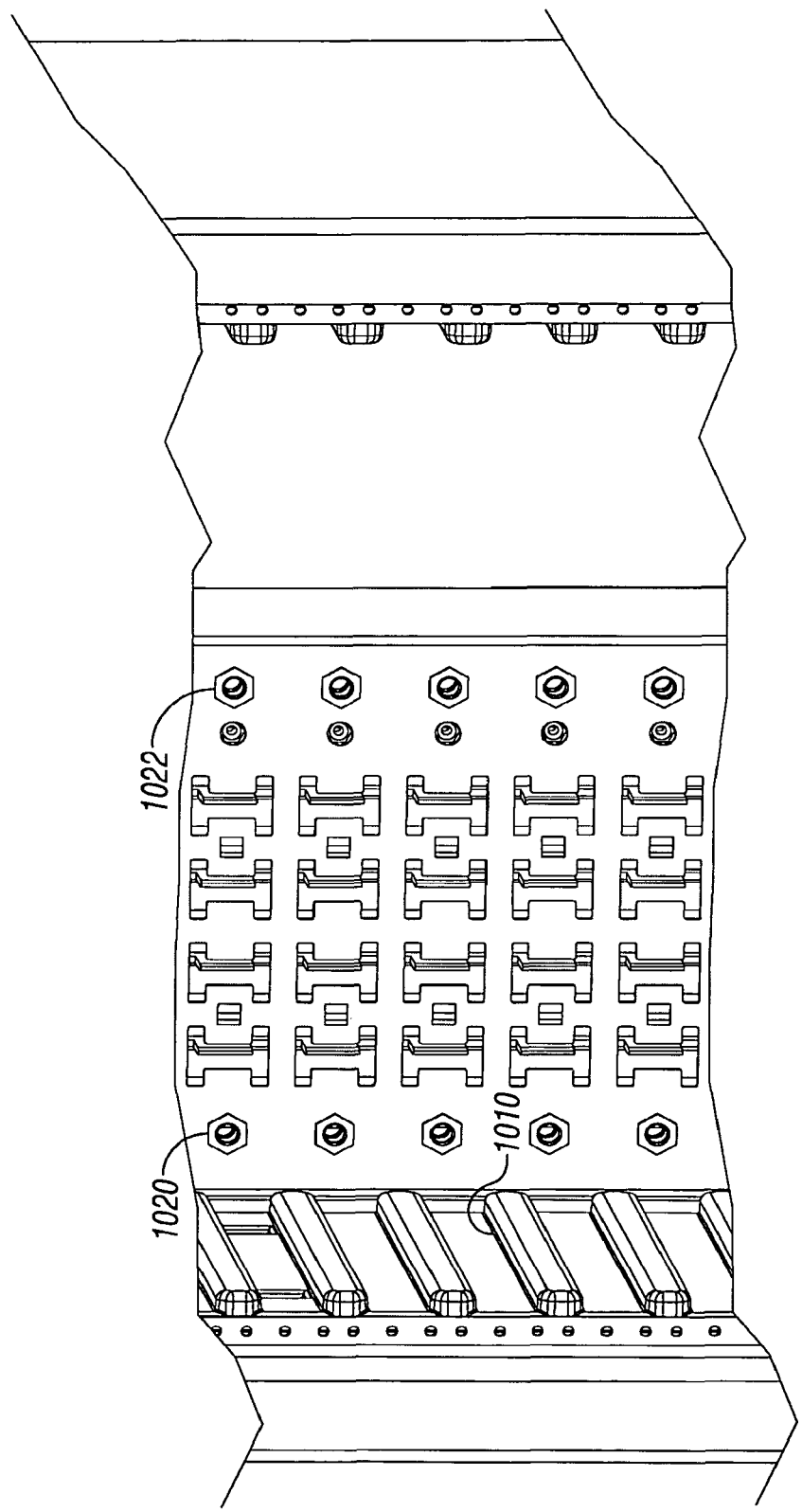
FIG. 10 illustrates the busbars and the safety cage as used.

The breaker module in FIG. 9 plugs into the rack areas shown in FIG. 10. Note that the rack area includes side guiding supports 1010. The breaker modules may have wheels to allow them to roll on the supports 1010. In addition, however, each area includes corresponding female receptacles 1020, 1022 which are bonded to the guard cage. The ground lug 902 extends into the ground hole 1022. This provides a ground connection immediately, prior to power application, and also provides structural support for the unit. After both ground pins are connected, that is ground lug 902 is connected to hole 1022, and ground lug 904 is connected to hole 1020, the unit can be slid further into place. At this time, the crown connectors extend through the corresponding holes in the guard plate, and make contact with the corresponding bus bars.

The contact from the busbar connects to the breaker module 800 (FIG. 8), and is connected to a screw in unit 820 in FIG. 8 which includes metal bus bars connected to each of the three phases, and extending to a contactor connector 830, which itself connects to the contactor that screws onto the bus bar output portions such as 832.

Figure 11:
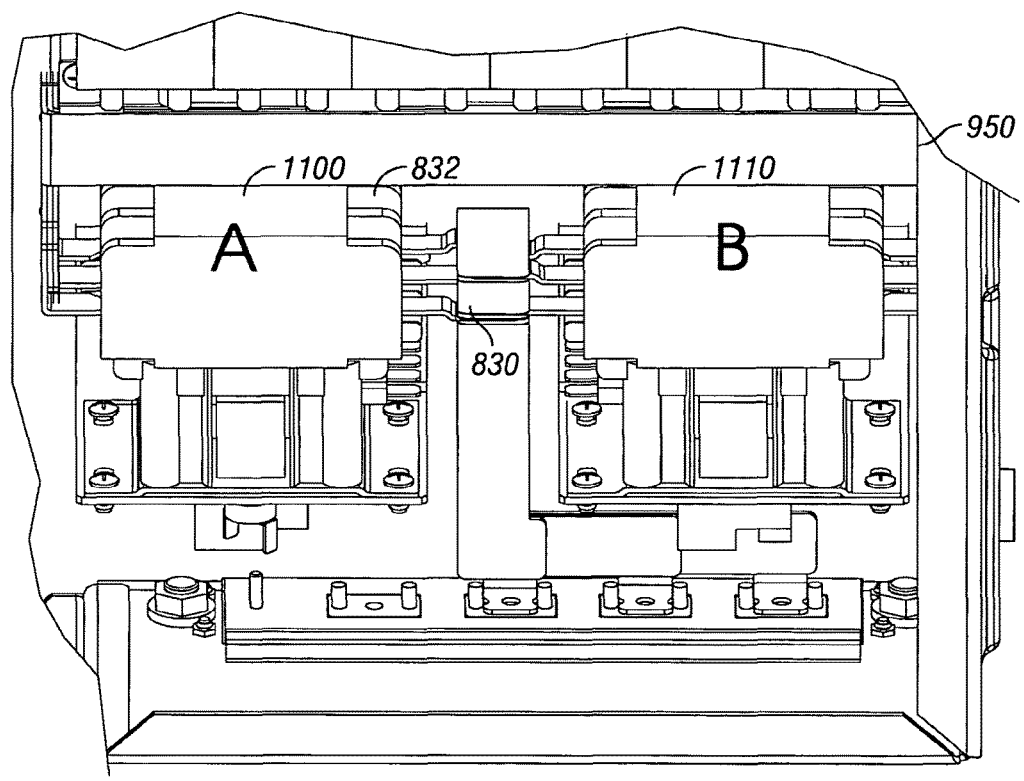
FIG. 11 illustrates the connection between the contactors and circuit breakers.

Again, the connector 820 is screwed to each of the three phases, and leads via solid metal to each of the tabs such as 832 on the connector 830. FIG. 11 shows how the connector 830 is connected to each of two contactors, 1100, 1110. Each of the contactors may be, for example, a 3 pole, double break, normally open contactor. The connector end 832 screws directly to the input terminal of the contactor.

The contactors are normally open and therefore maintain power off at their output.

Figure 9A:
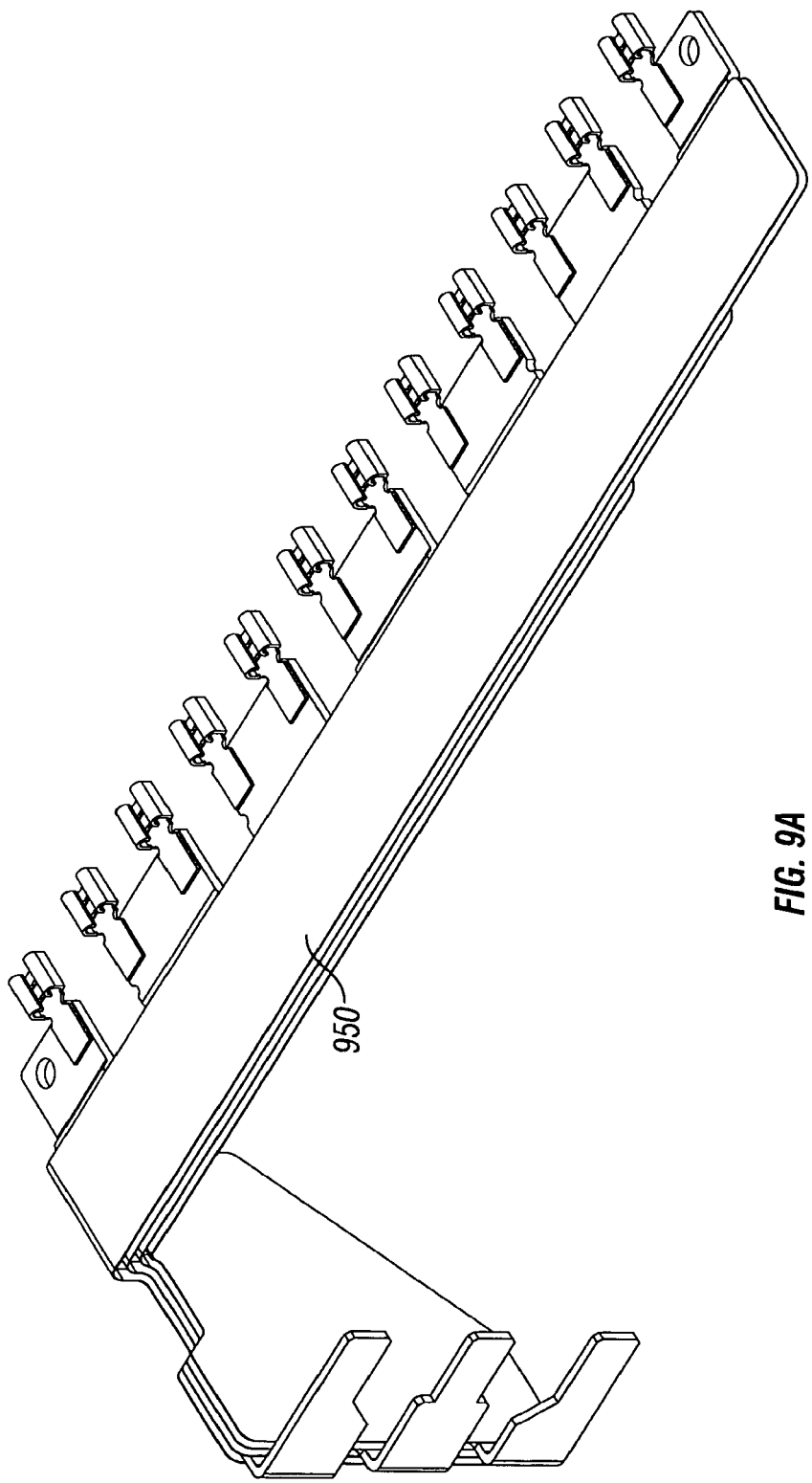
FIG. 9A illustrates the connector that is used to extend between the contactor and the circuit breakers.

The outputs of the contactors are connected via busbars 950 to a row of breakers 920, each breaker controlling a specific one of the outlets on the breakout box. The busbars 950 are shown in detail in FIG. 9a. The same busbar is used on the top and bottom, with the busbar simply being turned upside down for the bottom row. Each of these circuit breakers receives power that has been switched by the contactor in the way described above. The circuit breakers control the output of power to individual branch circuits.

The output of the circuit breakers is protected by the action of the circuit breaker, and hence overloads and overheating caused by overloading and short circuits can be protected. These outputs, switched via the breakers are connected via wires 918, to the trunk output connectors shown as 930, 932.

The breaker modules handle not only the electrical power, but also control signals. Both electrical power and control signals are output on the connectors 930 and 932.

Control electronics 940 may include a processor which controls specified control signals. For example, in an embodiment, the control signal for DMX is transmitted over an Ethernet line.

According to this system, the processor allows receiving control signals, and handling those control signals. For the embodiment of DMX, those control signals will be described as though they are DMX control signals controlling multiple different DMX universes. When the processor sees a new DMX universe, it asks the user to name the DMX universe. Then, that DMX universe is available everywhere on the Ethernet system, that is on each of the different breaker modules described above. The processor controls each of the different DMX universes, and allows selection of which universe appears on the trunk outputs 930, 932, and hence which breakout box will receive those universes. Each breakout box can accommodate 2 or more different DMX universes and the Ethernet signal. A user interface allows the DMX universe to be named. In operation, when the control circuit 940 recognizes a new DMX universe, it prompts the user to enter a name for it. The DMX can be received directly, or can be received over Ethernet, for example.

Figure 12:
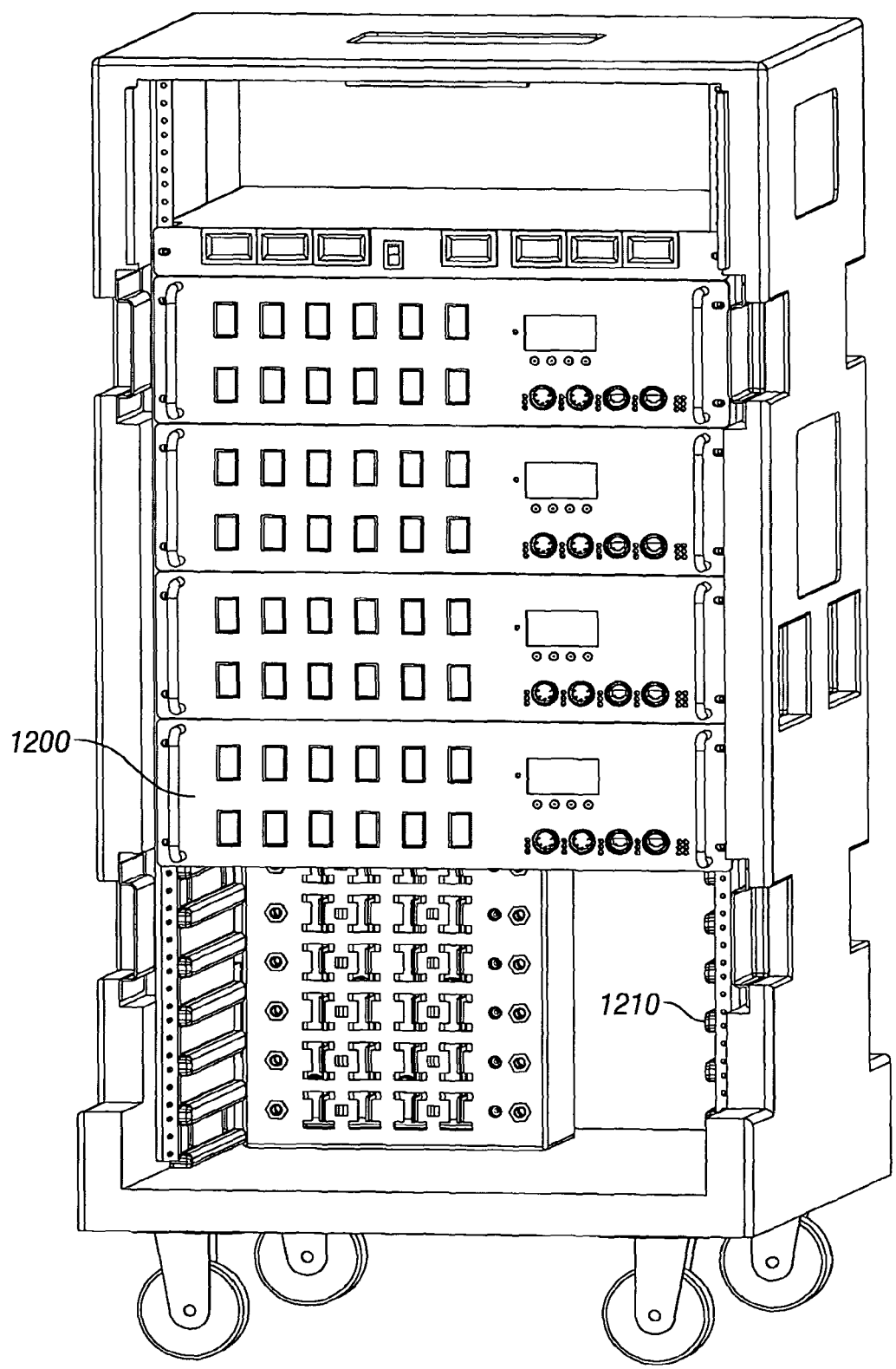
FIG. 12 illustrates the overall rack.

The devices may be all connected together, as shown in FIG. 12 or connected in smaller groups allowing multiple Ethernet and/or Local Area Networks (LANs) to exist. Each breaker module such as 1200 controls output voltage and outputs control signals for a specified one or more breakout boxes. Each breaker module carries a specified voltage. For example, breaker modules 1200 produces a 208 volt output and hence is arranged to interface with breakout boxes that are configured for 208 volts. Breaker modules 1205 support breakout boxes with 120 volt outputs.

Trunk outputs 932 and 930 carry the output signals which are sent to the breakout boxes. Note that the connectors include both power and signals for the breakout box in the same cable, as well as the safety key wires and safety ground connections.

A special cable assembly is used to carry the AC power and signals. The cable assembly includes an integrated cable assembly that combine six circuits of AC power, two twisted pairs of shielded high-speed data, five low-voltage key lines, and two safety ground lines.

Figure 13:
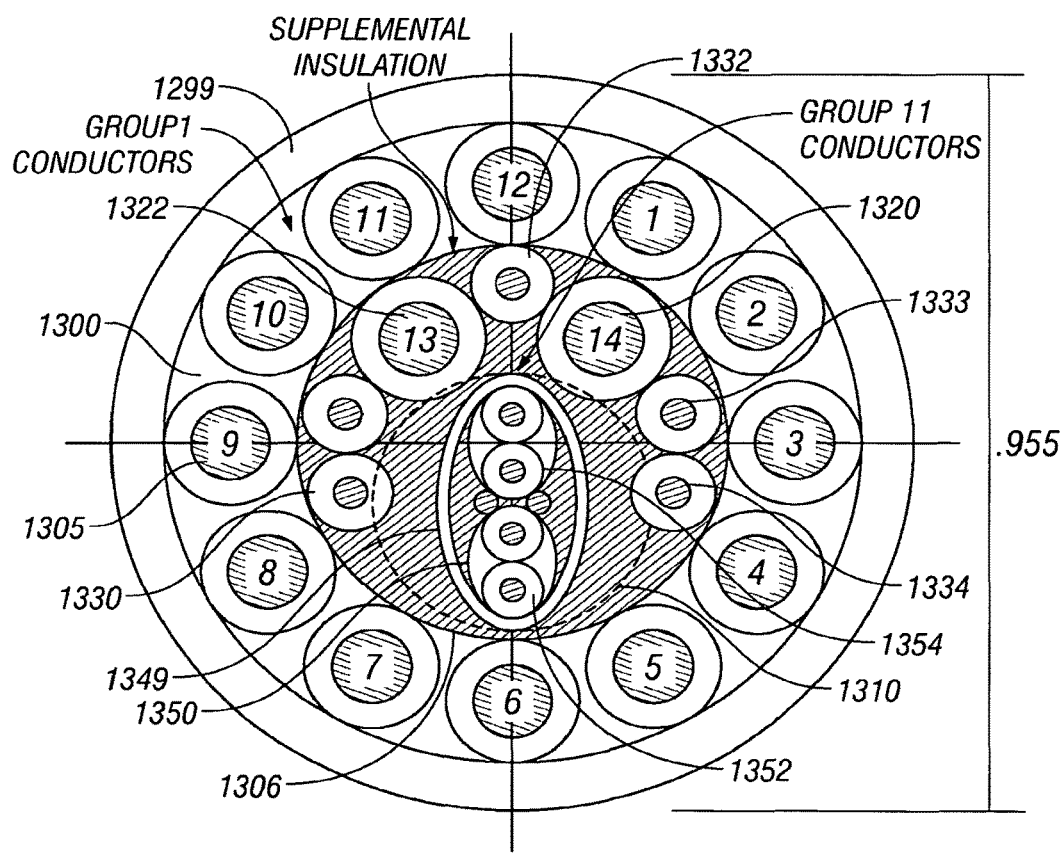
FIG. 13 illustrates a hypothetical cross-section of combined power/signal cables.

A cross-section of the composite cable is shown in FIG. 13. The composite cable is formed of coaxially arranged groups of conductors. An outer layer 1299 of insulation surrounds the entire cable. The coaxial ring of group I conductors 1300 is just inside the outer layer 1299. The group I conductors 1300 are formed of 12 individual power cables, each of which is separately identified, e.g., by color-coding. The power cables, for example, can be #12 Copper stranded power cables, with 600 volt insulation. These form the wires that carry the individually circuit breaker controlled power to the breakout boxes.

A supplemental insulation layer 1306 is located inside the group I conductors, and provides insulation between the group I conductors, and the group II conductors 1310 which themselves are coaxially located inside the group I conductors.

The group II conductors include a number of different wires of different wire types. The conductors 1320, 1322 are copper conductors, e.g., #12 wire, connected to earth ground. These form the safety ground connections. In one embodiment, each of the safety grounds has the same amount of current carrying capability as the each of the group I conductors. By using two safety conductors, a redundant safety circuit provides an extra level of safety.

The key wires are coaxially located in the group II connectors, formed of wires 1330, 1331 1332, 1333 and 1334. Two of these wires are connected together at the distal end to form the loopback connection as described above. Each of these wires may be individually color-coded. The key lines also carry DC power, e.g. on line 224 to the breakout box to power its internal electronics. The earth ground system is used to return this current back to the low voltage DC supply 264 within the breaker box.

In addition, Ethernet lines 1350 form another wire layer, separated from the Group II wires by a separate insulation area 1349. The Ethernet lines are formed from two twisted pairs 1352 and 1354, and are configured to conduct Ethernet signals over a distance of up to 500 feet.

Each of the three wire layers are separately insulated. Each of the insulation layers 1299, 1306 and 1349 may also include metal shields therein. The metal shields are preferably connected together to a ground connection.

Other embodiments are contemplated, and the disclosure is intended to encompass all embodiments and modifications which might be predictable based on the disclosed subject matter. For example, it should be apparent that other numbers of wires could be used, besides those specifically stated herein. Larger or smaller gauge wires can also be used. Also, different kinds of wire are contemplated. While the above describes the key wires requiring specified wires in the cable, it should be understood that the keying can be carried out in other ways, e.g. by using a specified voltage with different voltages for different breakout boxes, or a specified waveform, such as a square, wave for 120 V, a sinewave for 220, or any other kind of control signal.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A power supplying system comprising:
   a power supply system having multiple different power types therein, and power connections for each of said multiple different power types;
   a first connector, having power connections to receive one of said power types from the power supply system, and having control connections which are connected on the first connector;
   a switching device, connected to said multiple different power types,
   a control signal for said switching device, said control signal connected to said control connections, and
   where a connection to said control signal on said first connector causes said switching device to switch based on said control signal, the switching setting one of said multiple different power types to be produced on said first connector by activating said switching device to connect between said connections to said multiple different power types and said power connections, wherein said control connections comprise plural different connections on said first connector, where a first specified pair of said plural different connections controls commanding a first power type, and wherein said control for said switching device is a relay coil of a relay connected between said first specified pair of said plural different connections, and said switching device includes a connectable switch of said relay.

2. The system as in claim 1, wherein said different types of power are different phases of power.

3. The system as in claim 1, wherein said different types of power are different voltages.

4. A power supplying system comprising:
   a power supply system having multiple different power types therein, and power connections for each of said multiple different power types;
   a first connector, having power connections to receive one of said power types from the power supply system, and having control connections which are connected on the first connector;
   a switching device, connected to said multiple different power types,
   a control signal for said switching device, said control signal connected to said control connections, and
   where a connection to said control signal on said first connector causes said switching device to switch based on said control signal, the switching setting one of said multiple different power types to be produced on said first connector by activating said switching device to connect between said connections to said multiple different power types and said power connections, wherein said control connections comprise plural different connections on said first connector, where a first specified pair of said plural different connections controls commanding a first power type, wherein there are five different wires forming said control connection, and controlling of said first power type requires a connection between two specified wires of said five wires, where controlling of said power type is not carried out when said two specified wires are not connected.

5. The system as in claim 4, wherein said control for said switching device produces a voltage on a first wire, and detects said voltage being looped back on a second wire.

6. A power supplying system comprising:
   a power supply system having multiple different power types therein, and power connections for each of said multiple different power types;
   a first connector, having power connections to receive one of said power types from the power supply system, and having control connections which are connected on the first connector;
   a switching device, connected to said multiple different power types,
   a control signal for said switching device, said control signal connected to said control connections,
   where a connection to said control signal on said first connector causes said switching device to switch based on said control signal, the switching setting one of said multiple different power types to be produced on said first connector by activating said switching device to connect between said connections to said multiple different power types and said power connections;
a first breakout box having connections for a first type of power which is a first of said multiple different power types, and connected to a first connection type on said power system, where said first connection type is one of said control connections;
said control automatically preventing a power type other than said first type of power from being applied to said first breakout box when connected to said first connection type;
and a second breakout box for power to said first connection type on said power system, said second breakout box having connections for a second type of power which is a first of said multiple different power types, and wherein said connection for the second type of power are different than the connections for the first type of power; and
said control automatically preventing a power type other than said second type of power from being applied to said second breakout box when connected to said second connection type, where said second connection type is one of said control connections.

7. The system as in claim 6, wherein said control connections comprise a plurality of wires, wherein said control operates by allowing power output only when a second control signal is received on a second of said plurality of wires; and providing the plurality of wires in a connection between said second breakout box and said power system, providing the first providing a third control signal on a third of the plurality of wires and allowing power output only when a fourth control signal is received on a fourth of said plurality of wires.

8. The system as in claim 6, further comprising network-based signals within said power system, and said network-based signals are also present on said first connector.

9. The system as in claim 6, wherein said control operates for automatically preventing a wrong power type using circuit connections that maintain deenergized a relay that is in series with said power.

10. The system as in claim 9, wherein said circuit connections that maintain said relay deenergized comprises a connection to a coil of said relay to a second wire, so that said coil is driven by a second control signal being received only on said second wire.

11. A power supplying system comprising:
a power supply system having multiple different power types therein, and power connections for each of said multiple different power types;
a first connector, having power connections to receive one of said power types from the power supply system, and having control connections which are connected on the first connector;
a switching device, connected to said multiple different power types,
a control signal for said switching device, said control signal connected to said control connections, and
where a connection to said control signal on said first connector causes said switching device to switch based on said control signal, the switching setting one of said multiple different power types to be produced on said first connector by activating said switching device to connect between said connections to said multiple different power types and said power connections,
providing a power connection between input power and at least one circuit breaker, where the power connection comprises busbars and all metal-to-metal bolted connections between said connection to each busbar, and a connection to said circuit breakers.

12. The system as in claim 11, wherein said power connection includes a plurality of bus bars, and further comprising a shield for the bus bars using a cage with holes.

13. The system as in claim 12, wherein at least a plurality of said holes are grounded holes.

14. A power supplying system comprising:
a power supply system having multiple different power types therein, and power connections for each of said multiple different power types;
a first connector, having power connections to receive one of said power types from the power supply system, and having control connections which are connected on the first connector;
a switching device, connected to said multiple different power types,
a control signal for said switching device, said control signal connected to said control connections, and
where a connection to said control signal on said first connector causes said switching device to switch based on said control signal, the switching setting one of said multiple different power types to be produced on said first connector by activating said switching device to connect between said connections to said multiple different power types and said power connections, wherein said connection is via a connector, and further comprising a connection to said connector which has a structure to connect ground pins of said connector first, to connect signal pins of said connector second after connecting said ground pins, and to connect power pins of said connector third after connecting said ground pins and said signal pins.

* * * * *